(12) United States Patent
Mast et al.

(10) Patent No.: US 7,363,819 B2
(45) Date of Patent: Apr. 29, 2008

(54) HIGH-PRESSURE SENSOR HOUSING WHICH IS SIMPLIFIED BY MEANS OF A CONNECTION ELEMENT (ALSO EMC)

(75) Inventors: Martin Mast, Gerlingen (DE); Berthold Rogge, Stuttgart (DE); Masoud Habibi, Schwieberdingen (DE); Ralf Kaiser, Unterbruenden (DE); Thomas Moelkner, Stuttgart (DE); Joerg Gebers, Hemmingen (DE); Carsten Kaschube, Nuertingen (DE); Lothar Baumann, Wernau (DE); Hans-Peter Didra, Kusterdingen-Jettenburg (DE); Roger Frehoff, Gerlingen (DE); Markus Fissler, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 10/518,682

(22) PCT Filed: Jun. 18, 2003

(86) PCT No.: PCT/DE03/02042

§ 371 (c)(1),
(2), (4) Date: Jun. 28, 2005

(87) PCT Pub. No.: WO04/001362

PCT Pub. Date: Dec. 31, 2003

(65) Prior Publication Data

US 2006/0164203 A1    Jul. 27, 2006

(30) Foreign Application Priority Data

Jun. 22, 2002  (DE) .................. 102 27 989
Apr. 4, 2003   (DE) .................. 103 15 405

(51) Int. Cl.
*G01L 9/00*  (2006.01)
*G01L 9/16*  (2006.01)

(52) U.S. Cl. ............................. 73/754; 73/753; 73/756

(58) Field of Classification Search .......... 73/700–756; 361/283.1–283.4
See application file for complete search history.

(56) References Cited

U.S. PATENT DOCUMENTS

| 4,939,497 | A | * | 7/1990 | Nishida et al. ................. 338/4 |
| 5,343,757 | A | * | 9/1994 | Tate ............................. 73/724 |
| 5,349,865 | A |   | 9/1994 | Kavli et al. |
| 5,526,692 | A | * | 6/1996 | Keiser ........................ 73/715 |
| 5,822,173 | A | * | 10/1998 | Dague et al. ............ 361/283.3 |

(Continued)

FOREIGN PATENT DOCUMENTS

DE    39 37 573    5/1991

(Continued)

*Primary Examiner*—Andre J. Allen
*Assistant Examiner*—Jermaine Jenkins
(74) *Attorney, Agent, or Firm*—Kenyon & Kenyon LLP

(57) ABSTRACT

A device for measuring pressure, in particular for measuring high pressure, is provided, having a pressure sensor situated in a sensor housing, the sensor housing having a first sensor housing part provided with a pressure connecting piece and a second sensor housing part provided with an electric terminal. To reduce the manufacturing cost, the second sensor housing part is attached to the first sensor housing part by a connecting part situated between the first sensor housing part and the second sensor housing part, it being possible for the connecting part to be manufactured as a simple punch bent part or thin-walled tubular part, for example.

11 Claims, 5 Drawing Sheets

U.S. PATENT DOCUMENTS

| | | |
|---|---|---|
| 5,993,223 A | 11/1999 | Rehoff |
| 6,227,055 B1 * | 5/2001 | Pitzer .......................... 73/715 |
| 6,282,966 B1 * | 9/2001 | Probst et al. ................. 73/715 |
| 6,311,561 B1 * | 11/2001 | Bang et al. ................... 73/708 |
| 6,351,996 B1 * | 3/2002 | Nasiri et al. ................. 73/706 |
| 6,453,747 B1 * | 9/2002 | Weise et al. ................. 73/715 |
| 6,494,099 B1 * | 12/2002 | Chikuan et al. .............. 73/706 |
| 6,543,672 B2 * | 4/2003 | Hirota et al. ............... 228/175 |
| 6,612,178 B1 * | 9/2003 | Kurtz et al. .................. 73/715 |

FOREIGN PATENT DOCUMENTS

| | | |
|---|---|---|
| DE | 100 14 992 | 10/2001 |
| EP | 0 797 085 | 9/1997 |
| EP | 1 016 573 | 7/2000 |
| EP | 1 098 183 | 5/2001 |
| EP | 1 211 496 | 6/2002 |

* cited by examiner

US 7,363,819 B2

HIGH-PRESSURE SENSOR HOUSING WHICH IS SIMPLIFIED BY MEANS OF A CONNECTION ELEMENT (ALSO EMC)

FIELD OF THE INVENTION

The present invention relates to a device for measuring pressure.

BACKGROUND INFORMATION

A device for measuring pressure, which is described in German Published Patent Application No. 100 14 992, for example, has a first sensor housing part, whose circumferential wall has a hexagonal shape, and a second sensor housing part which is provided with an electric terminal and is directly attached to the first sensor housing part. For this purpose, a groove, engaging the front face of a circumferential housing wall of the second sensor housing part, is cut into the first sensor housing part. The first housing part is flanged over the circumferential wall of the second sensor housing part in the area of the groove to fasten the first sensor housing part to the second sensor housing part.

SUMMARY OF THE INVENTION

According to one embodiment, the device for measuring pressure of the present invention is manufacturable in a more cost-effective and simpler way compared to the known related art. The first sensor housing part may be advantageously manufactured in a very simple manner as a plate-shaped base part without having to provide a groove or a flange on the first sensor housing part. An additional connecting part situated between the two sensor housing parts, which is manufacturable in a cost-effective manner from sheet metal or a thin-walled metal tube, for example, is provided for connecting the first sensor housing part to the second sensor housing part. The manufacturing cost of the first sensor housing part is reduced considerably due to the connecting part. The first sensor housing part may be thinner, thereby saving material costs, because no groove needs to be cut into it, nor does it have flanges. In particular, the first sensor housing part may be manufactured as a simple punched part. The connecting part is manufacturable in a particularly cost-effective way as a simple punch bent part or from a thin-walled tube.

To attach the first sensor housing part to the second sensor housing part a circumferential, such as a circular section of the connecting part is welded to a surface of the first sensor housing part.

In one embodiment, the connecting part may be attached to the second sensor housing part using a flange. In addition, a circumferential groove, which engages the front face of a circumferential housing wall of the second sensor housing part, is formed on the connecting part.

If the second sensor housing part is made of plastic, a section of the connecting part may also be embedded in the plastic of the second sensor housing part and another section, provided for connection to the first sensor housing part, may protrude therefrom. In this embodiment the second sensor housing part may be manufactured as a cost-effective injection-molded part for example, the connecting part being placed as an insert into the injection mold.

DETAILED DESCRIPTION

Figure 1:
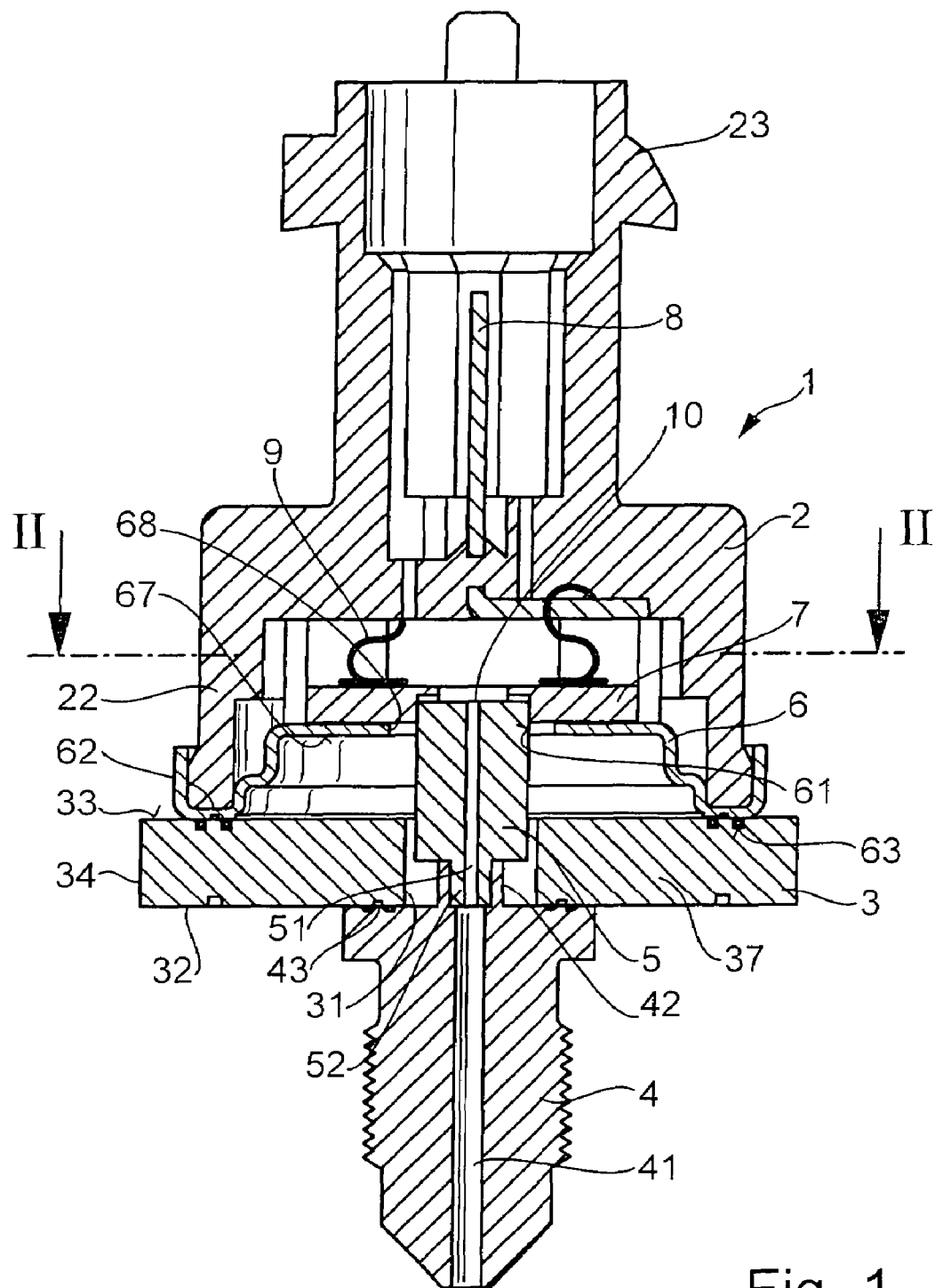
FIG. 1 shows a cross-section through a pressure sensor housing according to a first exemplary embodiment of the present invention.
Figure 2:
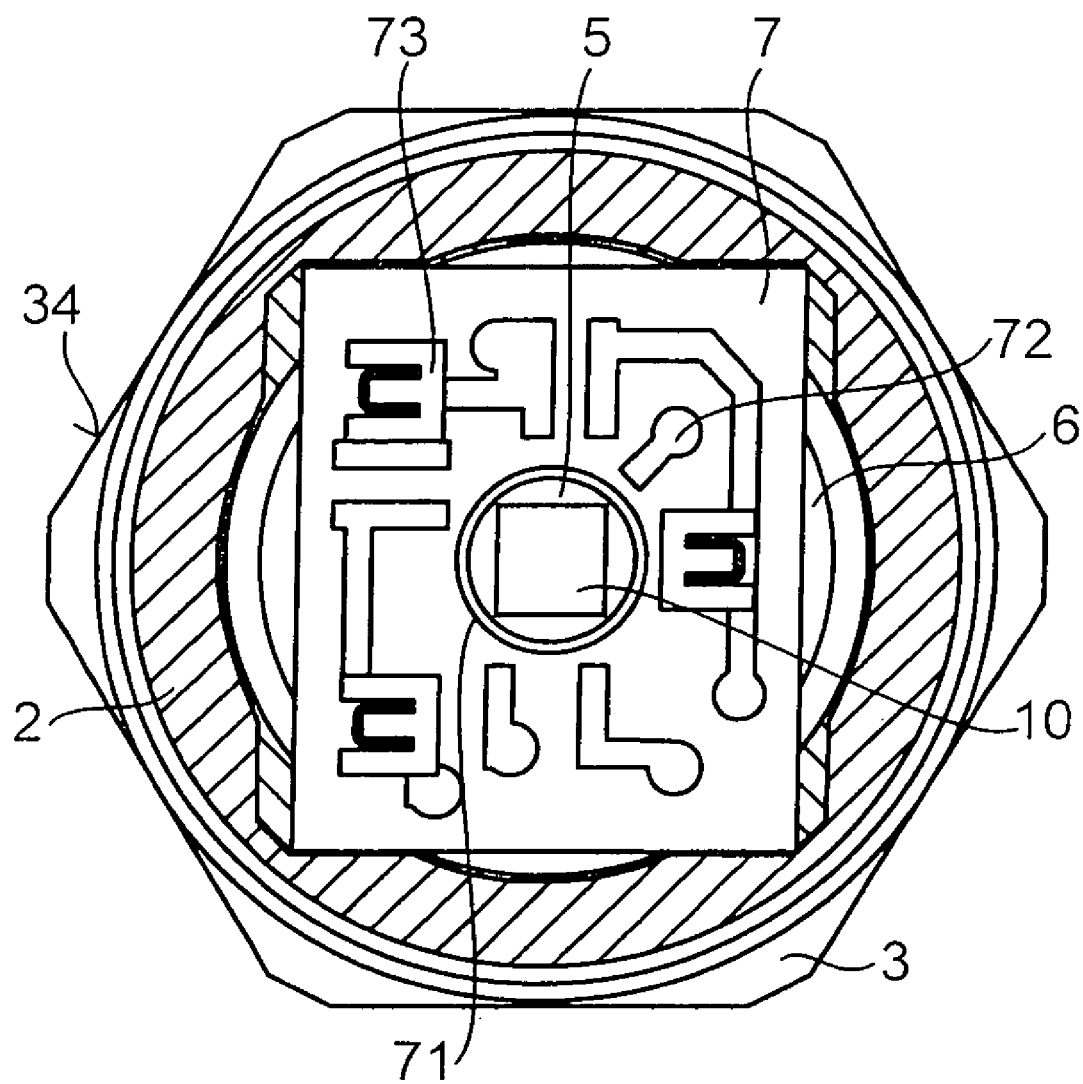
FIG. 2 shows a section along line II-II of FIG. 1.

FIGS. 1 and 2 show a pressure sensor housing according to a first exemplary embodiment of the present invention. A semiconductor pressure sensor 10 is soldered to a pedestal-shaped support 5. Pressure sensor 10 may be designed as a silicon chip and provided with sensor elements and a sensor diaphragm. In addition to the sensor elements, an analyzer circuit (not shown) may also be positioned on pressure sensor 10. In order to reduce thermal stresses between semiconductor pressure sensor 10 and support 5, support 5 is manufactured from a material matching the coefficient of expansion of silicon and may, in particular, be manufactured from an iron-nickel alloy (Invar®) or iron-nickel-cobalt alloy (Kovar®). As is apparent, pressure sensor 10 is connected to a first pressure channel section 51 situated in support 5, so that pressure may act upon the sensor diaphragm via first pressure channel section 51.

As is also apparent in FIG. 1, the side of pedestal-type support 5 facing away from pressure sensor 10 is connected by laser welding, for example, to a metallic connecting piece 4 made of stainless steel, for example. Connecting piece 4 is designed as a threaded connecting piece and is welded to outside 32 of a metallic first sensor housing part 3 as a separate component, connecting piece 4 covering a central passage 31 in first sensor housing part 3. Using connecting piece 4, the device may be fastened in a cutout provided with a mating thread. The approximately cylindrical support 5 has a smaller diameter than passage 31. On a side of support 5 facing away from semiconductor pressure sensor 10, there is a connecting piece 52, in whose center first pressure channel section 51 enters. The side of connecting piece 4 facing passage 31 has a circumferential collar 42, which is circumferentially situated on this side around a second pressure channel section 41 in connecting piece 4. Support 5, together with connecting piece 52, is inserted into collar 42 and welded thereto. Subsequently, support 5 may be pushed through passage 31 of first sensor housing part 3 and the connecting piece may be welded to outside 32 of first sensor housing part 3. In operation, the pressure is supplied from second pressure channel section 41 into first pressure channel section 51 and from there to the bottom of semiconductor pressure sensor 10.

First sensor housing part 3 is designed as a plate-shaped base part 37 having a first surface 33, a second surface 32 parallel thereto and facing outward, and a circumferential wall 34 which is suitable for applying a wrench and may be designed as a hexagon. Connecting piece 4 protrudes outward from second surface 32 of base part 37. Resting on surface 33 of first sensor housing part 3, facing away from outside surface 32, is a section 63 of a connecting part, which may be circular, designed in the exemplary embodiment of FIG. 1 as punch bent part 6 and welded to first sensor housing part 3. A section of connecting part 6 extending radially inward forms a platform 67 for placement of a printed-circuit board 7, which is electrically conductively connected to pressure sensor 10 via bonding wires (not shown). The top, provided with printed conductors 72 and electronic components, of the printed-circuit board placed on the punch bent part is situated approximately in the same plane as the top of pressure sensor 10. Support 5, on which pressure sensor 10 is situated, reaches through an opening 71 in the printed-circuit board and a central opening 68 in connecting part 6, as is best viewed in FIG. 2. Connecting part 6 may, however, also be designed without platform 67 and with an opening 68 of a larger diameter. In this case, printed-circuit board 7 may be placed on internal surface 33 of sensor housing part 3 with a spacer between them, for example.

Connecting surfaces 73 of printed-circuit boards 7 are connected, via contact spring elements 9, to electrical terminal elements 8, which are positioned in second sensor housing part 2 made of plastic, which is placed on punch bent part 6. Second sensor housing part 2 may, however, also be made from another material, for example, from metal. Terminal elements 8 are then to be insulated from second sensor housing part 2. Terminal elements 8 connect electric terminal 23 to the inside of sensor housing 1.

Connecting part 6 designed as a punch bent part has a groove-shaped contour 62, into which a cylindrically shaped wall 22 of second sensor housing part 2 is inserted. Second sensor housing part 2 is sealed against connecting part 6 by a sealing adhesive in contour 62. Connecting part 6 is attached to second sensor housing part 2 by a flange on the outer edge of connecting part 6 around the circumferential end section of wall 22.

Figure 3:
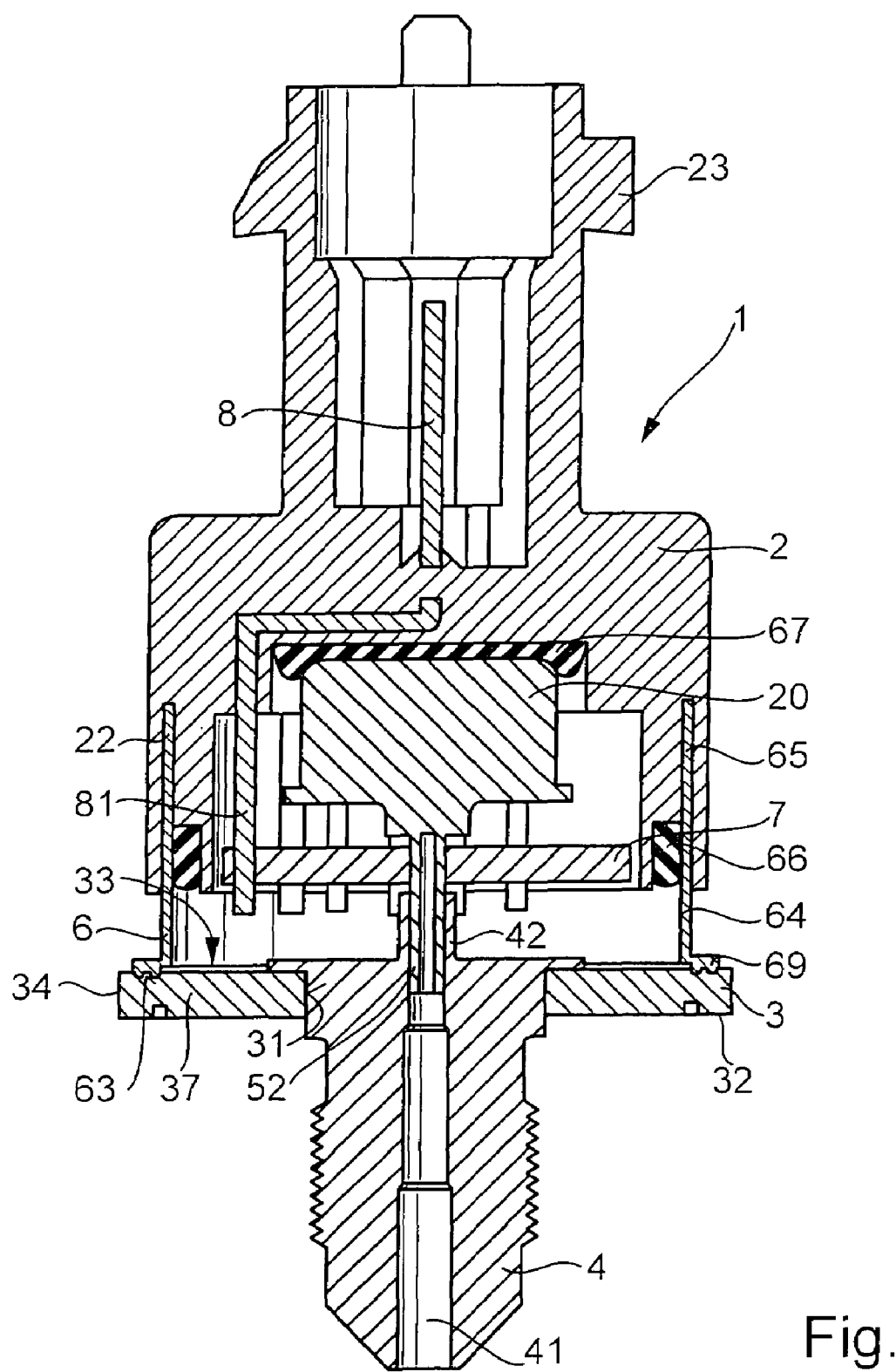
FIG. 3 shows a cross-section through a pressure sensor housing according to a second exemplary embodiment of the present invention.

A second exemplary embodiment is illustrated in FIG. 3. In this embodiment pressure sensor 10 is situated in a module housing 20, which is placed on a printed-circuit board 7. Electrical contact elements of the module are electrically connected to printed circuits on printed-circuit board 7, while a pressure connecting piece 52 of module 20 passes through an opening in the printed-circuit board and is inserted into a collar 42 of connecting piece 4 of sensor housing 1, being welded to it as shown in the embodiment of FIG. 1. Connecting piece 4 is in turn situated on a first sensor housing part 3, which is designed as a plate-shaped base part 37 having a first surface 33, a second surface 32 parallel thereto and facing outward, and a circumferential wall 34 which is suitable for applying a wrench and may be designed as a hexagon. Second sensor housing part 2 is manufactured as an injection-molded part made of plastic in this embodiment. The connecting part is formed by a tubular metal sleeve 64, which is placed as an insert into the injection mold. A section 65 of connecting part 6 is secured in a groove 22 of second sensor housing part 2, while another section 69 of the connecting part protrudes therefrom. A sealing adhesive 66 or a sealing ring may seal the connecting area of connecting part 6 and first sensor housing part 2 if this is desirable for sealing the sensor housing from the surrounding outside area. The outer edge of connecting part 6 is bent like a flange, forming a circular surface 63 which rests on first sensor housing part 3. Connecting part 6 is welded to first sensor housing part 3 in the area of surface 63. Electric terminal elements 8 are introduced to the inside of sensor housing 1 through second sensor housing part 2 and electrically connected to printed-circuit board 7. An adhesive 67 connects cover part 61 of pressure sensor module 20 to the inside of second sensor housing part 2.

Of course, in the exemplary embodiment illustrated in FIG. 3, the module housing may also be omitted and the pressure sensor may be situated in the sensor housing as FIG. 1 shows.

Vice versa, the pressure sensor module may also be used in the exemplary embodiment illustrated in FIG. 1.

Figure 4:
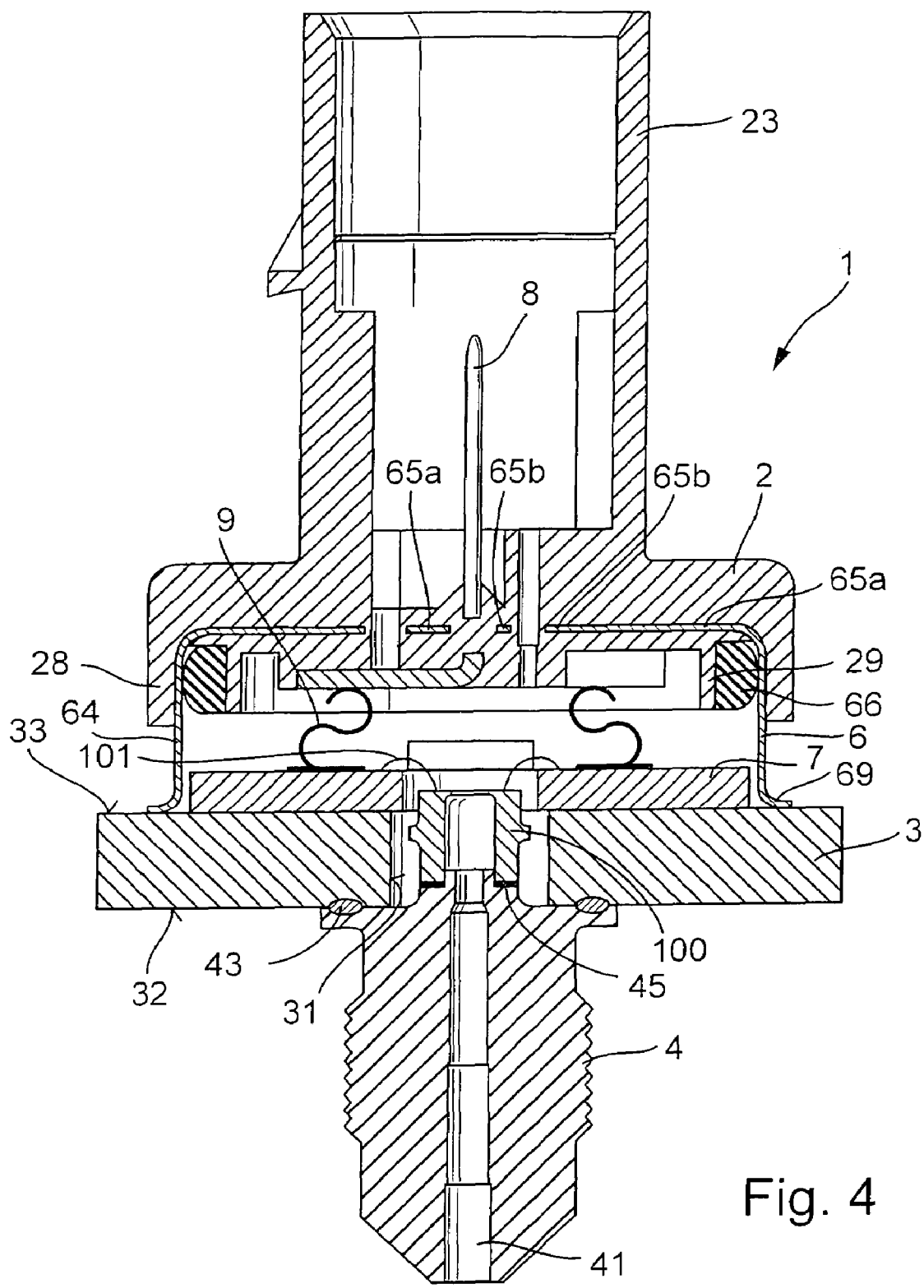
FIG. 4 shows a cross-section through a pressure sensor housing according to another exemplary embodiment of the present invention.
Figure 5:
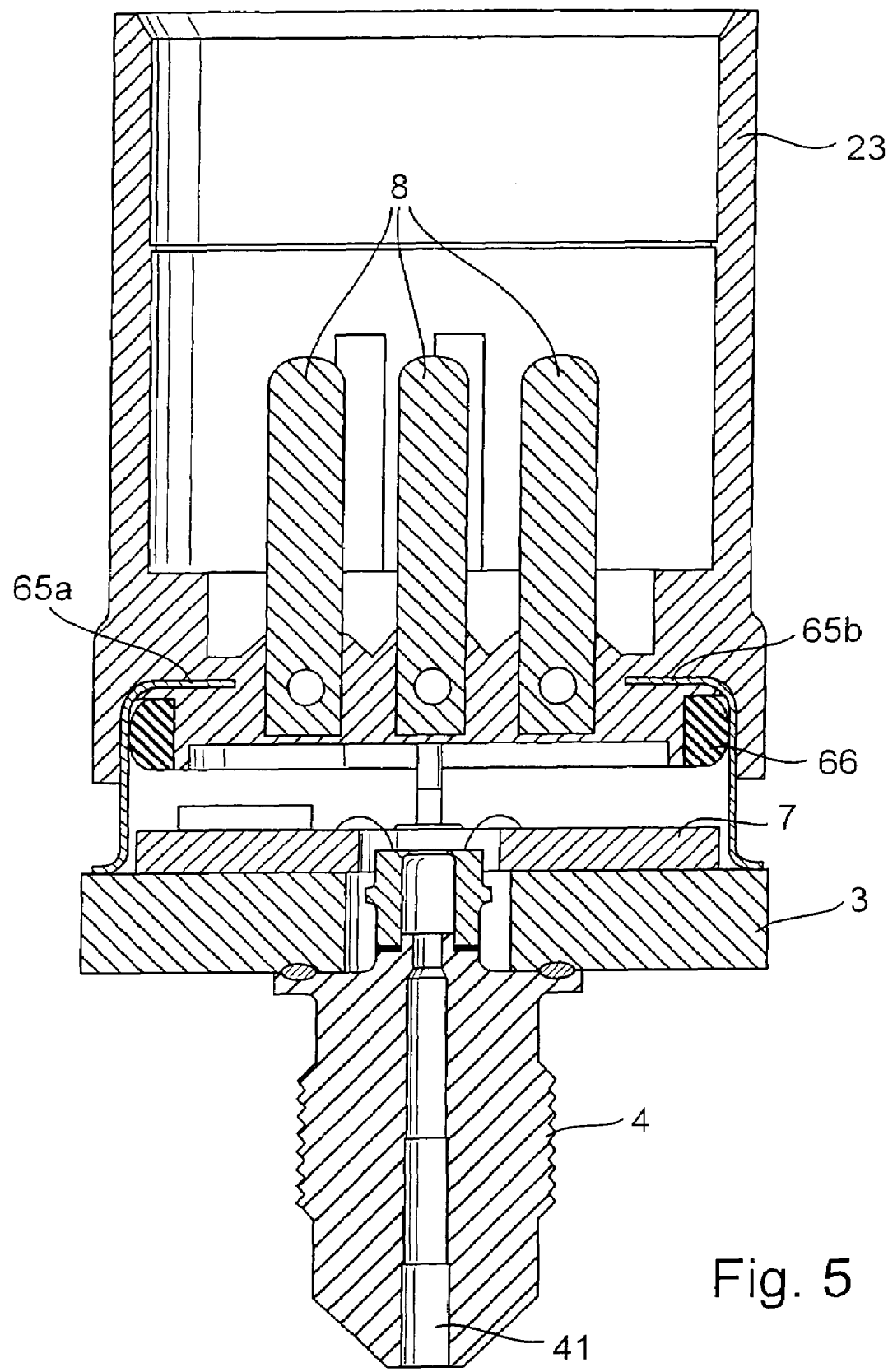
FIG. 5 shows another cross-section through a pressure sensor housing of FIG. 4.

FIGS. 4 and 5 show an additional exemplary embodiment of the present invention. In this embodiment, a pressure measuring cell 100 made of stainless steel, whose side facing away from pressure channel 41 is provided with resistors manufactured using thin-film technology and forming a Wheatstone bridge, for example, is used as the pressure sensor. The signal of the Wheatstone bridge is processed and amplified by an ASIC, for example, which is situated on a printed-circuit board inserted into the sensor housing or on a hybrid. Cup-shaped pressure measuring cell 100 is welded to a threaded connecting piece 4, which may be accomplished by laser welding, resistance welding, or electron beam welding, for example, or in some other manner. For this purpose, the open side of pressure measuring cell 100 is placed on a collar of connecting piece 4 and welded thereto in connecting area 45. The subassembly made up of connecting piece 4 and pressure measuring cell 100 is then inserted into passage 31 of a sensor housing part 3, which is designed as a plate-shaped base part, like in the other exemplary embodiments. In area 43, the connecting piece is welded to sensor housing part 3. A printed-circuit board 7 is glued to side 33 of first sensor housing part 3 facing away from the connecting piece, forming an electric ground terminal to the pressure sensor housing. An IC mounted by flip-chip technology and various other electronic components are situated on printed-circuit board 7. Contact springs 9 connect the printed-circuit board with terminal elements 8, which are situated in a second sensor housing part 2 and extend from a connector 23 into the inside of the sensor housing. The pressure measuring cell is connected to printed-circuit board 7 via bonding wires 101.

Second sensor housing part 2 is manufactured as an injection molded part together with terminal elements 8 injected therein and connecting part 6 injected therein. Connecting part 6 is designed as a deep-drawn part and is pot-shaped here having a cylindrical outer casing 64 and a bottom 65a, which is fully embedded in the plastic. Connecting part 6 may have a very thin-walled design. Terminal elements 8 and, optionally, passages connect the inside of the housing to terminal 23 of the sensor via recesses 65b in bottom 65a of the connecting part. The pot-shaped design of connecting part 6 provides an excellent EMC (electromagnetic compatibility) protection for the electronic analyzer components situated on printed-circuit board 7. Terminal elements 8 lead to the outside through small openings 65b in connecting part 6; therefore, connecting part 6, together with plate-shaped first sensor housing part 3, forms an almost enclosed EMC space. A circumferential adhesive bead 66 made of sealing adhesive material is used on the inside of the sensor housing between connecting part 6 and an annular wall 29 of second sensor housing part 2. It is also possible to provide the adhesive bead on the outside of the connecting part or to also inject an O-ring between outer wall 6 and the outer periphery of the second sensor housing part. The edge of the connecting part facing away from second sensor housing part 2 is bent outward and forms a circumferential collar 69, which is welded to side 33 of the first sensor housing part, which may advantageously be accomplished by laser welding or resistance welding, so that a temperature-stable, permanent joint is formed.

The exemplary embodiment illustrated in FIGS. 4 and 5 advantageously makes it possible to reduce the sensor height, while simplifying the overall design and improving the EMC shielding considerably.

The pressure sensors presented are applicable, for example, for use in motor vehicle transmissions, fuel direct injection, or as pressure sensors in a common rail system.

What is claimed is:

1. A device for measuring pressure, comprising:
a sensor housing including a first sensor housing part and a second housing part, the first sensor housing part having a pressure connecting piece and the second sensor housing part having an electric terminal; and
a pressure sensor situated in the sensor housing, wherein:
   the second sensor housing part is coupled to the first sensor housing part by a connecting part situated between the first sensor housing part and the second sensor housing part, and
   the second sensor housing part is made of plastic, and the connecting part includes a first section that is secured in position in the plastic of the second sensor housing part and a second section that protrudes from the second sensor housing part and configured for connection to the first sensor housing part.

2. The device of claim 1, wherein the connecting part is one of a punch bent part, a deep-drawn part, and a thin-walled tubular part.

3. The device of claim 1, wherein the first sensor housing part includes a plate-shaped base part having a first surface, a second surface parallel to the first surface, and a circumferential wall configured for cooperating with a wrench, the connecting part being situated on the base part, protruding from the second surface.

4. The device of claim 3, wherein the circumferential wall is formed in the shape of a hexagon.

5. The device of claim 1, wherein the connecting part includes a circumferential section, the circumferential section being welded to a surface of the first sensor housing part.

6. The device of claim 1, wherein the circumferential section is circular.

7. The device of claim 1, wherein the connecting part includes a flange that couples to the second sensor housing part.

8. The device of claim 7, wherein the second sensor housing part includes a circumferential housing wall having a front face, and the connecting part includes a circumferential groove which engages with the front face of the circumferential housing wall of the second sensor housing part.

9. The device of claim 1, further comprising:
one of a circumferential sealing adhesive and a gasket situated between the second sensor housing part and the connecting part.

10. The device of claim 1, further comprising:
a printed-circuit board situated on the first sensor housing part;
a pressure measuring cell welded to the connecting piece and electrically coupled to the printed-circuit board via bonding wires; and
wherein the pressure measuring cell is at least partially situated in a passage in the first sensor housing part.

11. The device of claim 1, wherein the connecting part together with the first sensor housing part form a substantially enclosed EMC space including openings, electrical terminal elements being guided externally through the openings.

* * * * *